United States Patent Office 3,847,889
Patented Nov. 12, 1974

3,847,889
PROTEIN SEPARATION BY INSOLUBLE, AMPHOTERIC ION EXCHANGERS
Linda Fryklund and Jerker Olof Porath, Uppsala, Sweden, assignors to Exploaterings Aktiebolaget T.B.F., Uppsala, Sweden
Continuation of application Ser. No. 96,735, Dec. 10, 1970. This application Mar. 30, 1973, Ser. No. 346,619
Claims priority, application Sweden, Dec. 22, 1969, 17,721/69
Int. Cl. C07g 7/00
U.S. Cl. 260—112 R          5 Claims

ABSTRACT OF THE DISCLOSURE

The present invention relates to a method of separating proteins by selectively adsorbing them in a bed of an adsorbent. The adsorbent is constituted of an insoluble, organic coupling product whereby weak adsorption centres in relatively high density are provided on a hydrophilic matrix. The adsorption is based on ion-dipole-interaction where dipoles fixed at the gel matrix are of the dipolar ions type and where the proportion between the basic and the acid groups is a simple, stoichiometric relationship.

---

Figure 1:
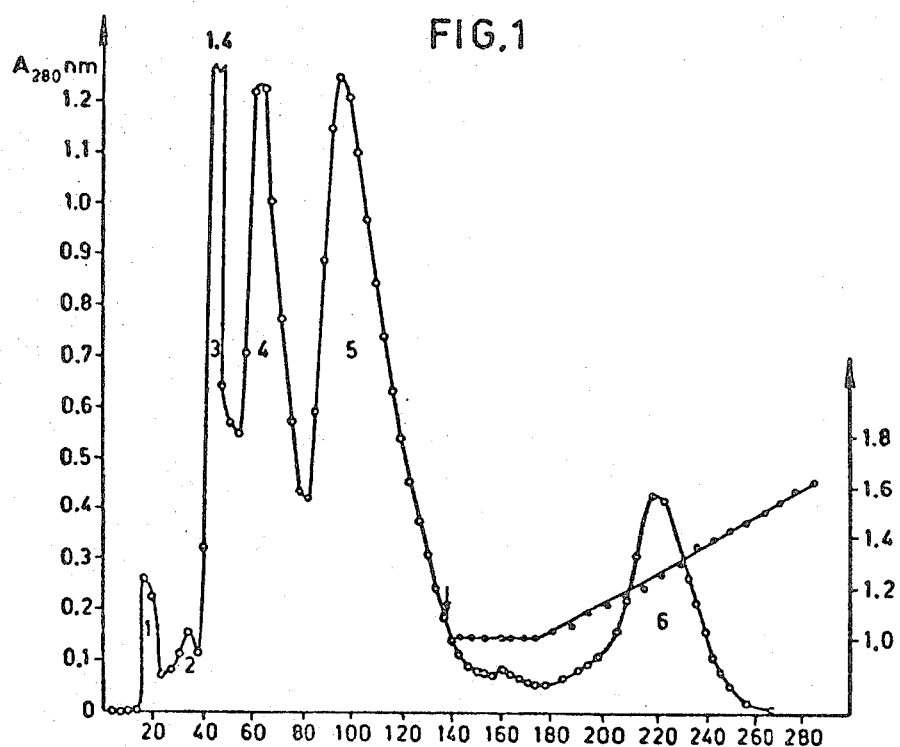

This is a continuation, of application Ser. No. 96,735, filed Dec. 10, 1970, now abandoned.

Difficult problems have arisen in the attemps to develop chromatographic protein fractionation and the great advances in the chromatography of amino acids and other low molecular weight substances have not been parallelled in the chromatographic fractionation of proteins. Protein chromatography on ion exchangers is technically simple but theoretically complicated. There is no quantitative theory as a guide for practical tests, but only empirical experience, qualitative deliberations and guesses about the ionic processes in the ion exchanger bed.

Adsorption and desorption are conditioned by the complicated interaction between competing ion reactions involving ion exchangers, proteins, buffer ions and other low molecular weight ions. The density of charge in the ion exchanger matrix, as well as the charged conditions on the surface of the protein molecules, has a decisive influence on the adsorption-desorption processes. As a rule, the proteins are anchored to ion exchangers by multi-point contacts which leads to a wide distribution of the protein molecules with regard to the strength with which they are bonded to the ion exchanger, since there is a dissimilarity in bonding strength between different ion groups. Therefore, the proteins will be unilaterally distributed between the ion exchanger phase and the surrounding solvent, and thus be adsorbed either quantitatively or not at all.

In order to increase the separation effect in ion exchanger chromatography where the distribution coefficients for the protein components oscillate between infinity and zero, a so-called gradient elution is used whereby the composition of the ingoing eluant is continuously changed and the calculation of the shape and position of the outgoing gradient becomes difficult with ion exchangers used to date since the gradient successively alters appearance when it passes through the bed.

In beds of granulated, uncharged gels, proteins and low molecular weight substances migrate as non-overlapping, often well separated zones. The separation is based on selective exclusion and reflects the dissimilarity in molecular size and form. The fractionation is conditioned by differentiated permeability and not by affinity.

In certain cases, basic proteins are greatly retarded on commercially available gels more than the corresponding sieving effect. For example, lysozyme is adsorbed on Sephadex at low ionic strength. The adsorption is probably conditioned there by the presence of sparsely distributed carboxyl groups in the gel matrix.

With this as a starting point, the present invention aims at preparing better adsorbents for protein chromatography than those now available. For this purpose, the matrix ought to be hydrophilic and contin weak adsorption centres in relatively high density, 100–1000 μekv./g. The absorption ought to be based on ion-dipole-interaction where dipoles fixed at the gel matrix can be of the dipolar ion type (ampho ions).

The principle for dipole-ion chromatography is as follows:

(a) Matrix $-B^+-A^-+b^+-$solution $\rightleftharpoons$ matrix $-B^+-A^- \ldots b^+-$solution or (b) Matrix $-B^+-A^-+a^--$solution $\rightleftharpoons$ matrix $-B^+-A^- \ldots a^--$solution where $B^+$, $b^+$ and $A^-$, $a^-$ are positive respective negative charged substituents.

It is particularly interesting that the field potential decreases faster around dipoles than around point charges. For an isolated dipole and single charge, respectively, the following applies:

(1) $$\text{dipole } \psi = \frac{q.l \cos \theta}{D.r(r+l \cos \theta)}$$

(2) $$\text{ion } \psi = \frac{q}{D.r}$$

where $q$ is the positive or negative charge of the dipole or the ion; $r$ is the distance from the dipole's positive pole (or from the ion in case 2) to the set-out filed point; $l$ is the dipole distance (the distance between the two charges of the dipole); $\theta$ is the angle between the dipole axis and the interconnecting line between the positive pole and the field point and, D is the dielectric constant of the medium.

An advantage with dipole-ion-exchange chromatography is that the introduced charge shield ($\psi$) can be finely adjusted by controlling the dipole distance, 1. This can be done by inserting a bridge of e.g. methylene groups between the charges. The amphoteric character of the adsorbent can be expected to produce interesting results in the chromatography of ampholytes as well as ordinary salts.

Amphoteric ion exchangers are well known as adsorbents. They have been produced by condensation of amines and phenols, from polystyrene via the introduction of quaternary amino groups and sulphonate groups, and by polymerizing polycations or polyanions into cation- and anion exchangers (e.g. commercial Retardion). The amphoteric ion exchangers are used as adsorbents for electrolytes.

Amino acids joined to polymers containing many hydroxyl groups—e.g. agar, Sephadex and cellulose—give products usable for protein chromatography. It is thereby essential that the matrix is hydrophilic—i.e. can be moistened or swelled in water—and that the proteins can penetrate into the polymeric gel. This is not the case for the amphoteric ion exchangers used hitherto for chromatography. Ion exchangers suitable for protein chromatography have previously been prepared by introducing acid or base groups in cellulose, Sephadex, etc., "Amino acid ion exchangers" prepared using a polysaccharide matrix (agarose, Sephadex, cellulose) are amphoteric ion exchangers suitable for protein chromatography i.e. they bring together two important properties of ion exchanger types providing adsorbents for proteins on which fast ion equilibration can occur. The dipole character of the adsorption-active groups endow the adsorbents with new valuable properties for separations of heterogeneous proteins and other polyelectrolytes.

Amino acids can be joined to hydrophilic polymers by different methods. One procedure is e.g. to use cyanogen bromide polymer in order to form, inter alia, imino carbon dioxide esters, e.g.:

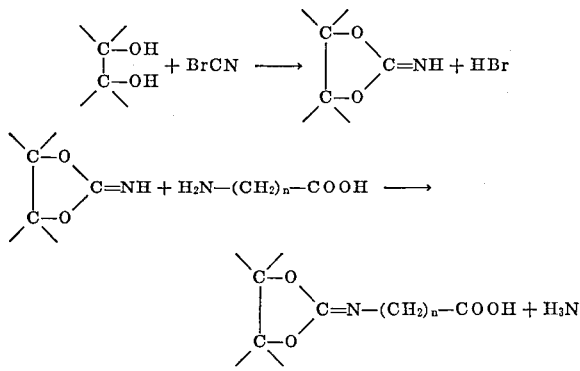

Thus, the amphoteric properties of the amino acids are retained after the union. Similar derivatives of amino acids and hydrophilic gels can, according to the above reasoning, be suitable as protein adsorbents.

Many other methods of preparing dipolar adsorbents are possible. For example, vinyl acetate and vinyl pyridine can be copolymerized with divinyl sulphon or divinyl benzene as a cross-linking substance. The acetyl groups can then be removed by hydrolysis and the polymer can be transformed with halogen carboxylic acids. Example:

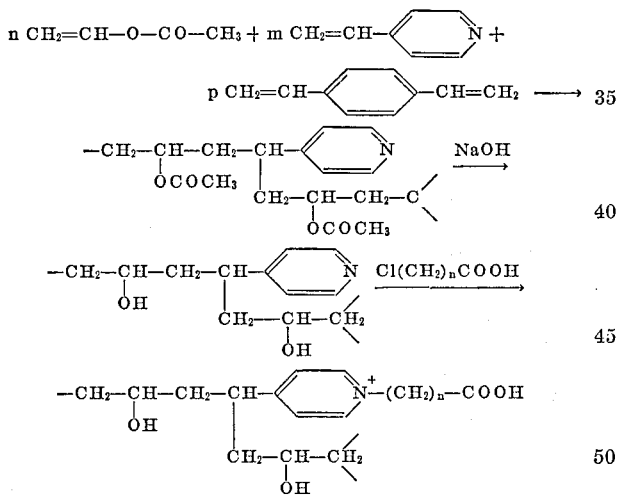

Amino ethyl cellulose can also be alkylated, e.g. with halogen carboxylic acids in excess so that complete alkylation takes place. Example:

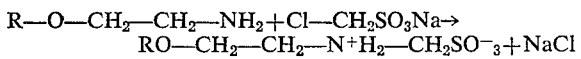

where R is cellulose or another hydroxyl-containing polymer.

These amphoteric ion exchangers have totally lived up to expectations. In the test, we have used cobra venom (*Naja nicricollis*) as test material, partly raw venom and partly venom proteins—i.e. venom from which low molecular weight substances are removed by gel filtration on Sephadex G–25. The venom contains a large number of simple proteins in the molecular weight range of 6000–20000, the overwhelming part being strongly basic.

Figure 2:
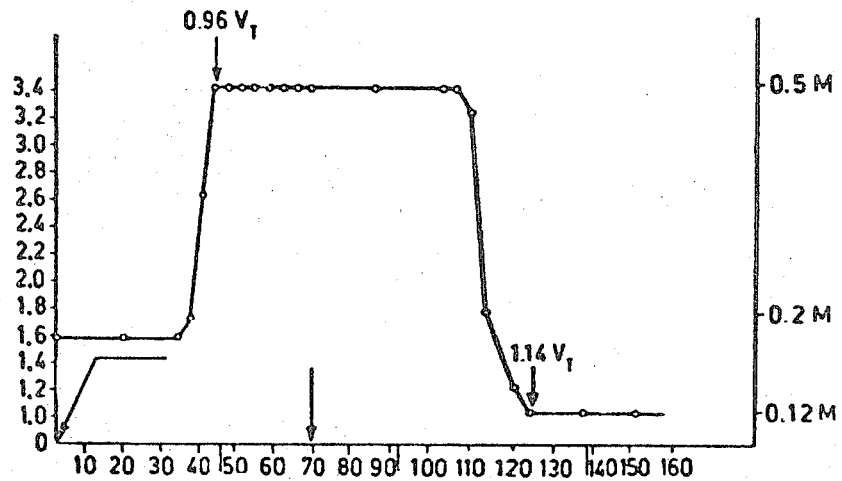
Figure 3:
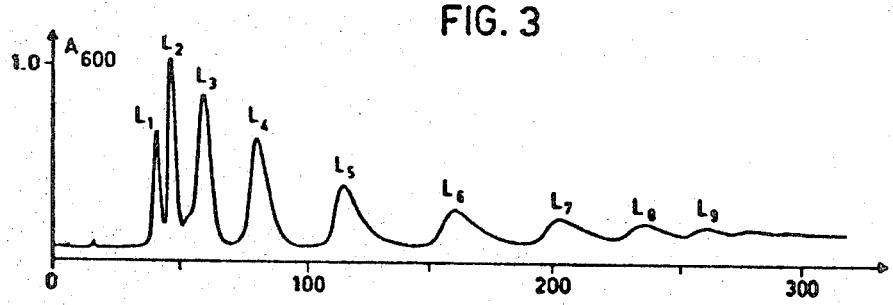
Figure 4:
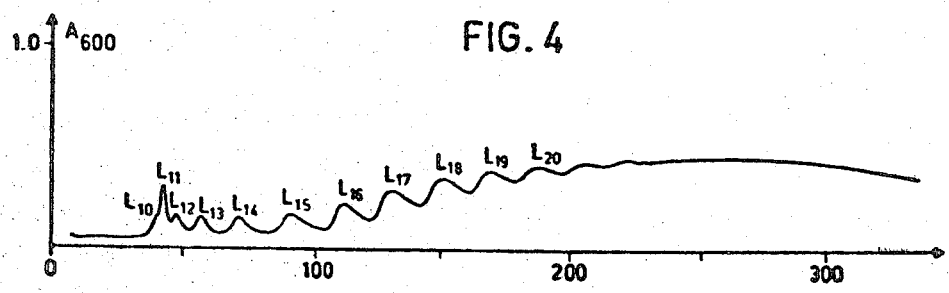

The good results obtained with the use of the invention are clearly revealed by the examples and drawings below. FIG. 1 shows the adsorption at 280 nm. as a function of the elution volume. FIG. 2 shows the conductivity curve when eluting with buffers. FIGS. 3 and 4 show the adsorption at 600 nm. after reaction with ninhydrin as a function of the elution volume.

EXAMPLE 1

A bed 58.5 x 1 cm. of cross-linked dextra gel (Sephadex G–75) to which $\beta$-alanine is joined with the cyanogen bromide method (about 750 microequivalents $\beta$-alanine per gram of dry gel material) is prepared in 0.12 molar of ammonium acetate, adjusted to pH 6.0 with acetic acid. 1 ml. of solution containing 100 mg. cobra venom (*Naja nigricollis* toxin) is placed over the bed and sucked into the bed when a faucet is opened under it. The ammonium acetate solution, according to the above, is thereafter introduced so that a chromatographic separation is obtained. When 140 ml. of this salt solution had been introduced, the salt concentration increased considerably. Analysis of the eluent from the bed showed that 6 components were separated (FIG. 1).

EXAMPLE 2

A bed 52.8 x 1 cm. is prepared in 0.05 M ammonium acetate, pH 6.0 cellulose to which is coupled 300 microequivalents $\beta$-alanine per gram (dry weight). 40 mg. of the same cobra venom as in Example 1 in 1 ml. acetate buffer is introduced into the bed and chromatographed when the bed is washed with 121 ml. 0.05 M acetate solution. Thereafter it is eluted with 0.2 M ammonium acetate buffer of the same pH. With 0.05 buffer, 5 components are obtained separated; the rest of the material of another composition is released from the $\beta$-alanine-cellulose with the buffer of the higher concentration.

EXAMPLE 3

1 ml. of a water extract of rapeseed is transferred to a column of $\beta$-alanine-Sephadex G–75 in 0.1 mols ammonium acetate, pH 6.0 (column dimensions 60 x 1 cm.). Three well separated components are obtained.

EXAMPLE 4

2 ml. of dialysed human serum was introduced into a bed of 56.5 x 1 cm. agarose beads (containing 6% agarose and 94% water) to which 248 microequivalents arginine are coupled by the cyanogen bromide method. The bed was prepared in tris-hydroxyl-methyl amino methane-HCl buffer, "Tris"-HCl (0.02 mols with respect to Tris) pH 8.6. In elution with this buffer, two components are obtained. By doubling the concentration of salt, one further component containing serum albumin is obtained. Further protein is obtained when eluting with 0.5 mols Tris-HCl pH 8.0.

EXAMPLE 5

In order to test how quickly salt equilibration occurs on dipolar adsorbents of the type referred to in the invention, the following experiments, inter alia, were conducted.

184 ml. 0.03 mols Tris-HCl, 160 ml. 0.1 mols Tris-HCl and finally 100 ml. 0.03 mols Tris-HCl were introduced consecutively into the column from test 4. All buffer solutions were adjusted to pH 8. 3.3 ml. fractions were collected. The conductivity in each fraction was measured. The conductivity descent was obtained within a volume of approximately 20 milliliter.

EXAMPLE 6

Glycine cellulose where glycine is coupled with epichlorohydrin, about 200 microequivalents/g. Chromatography is done on a mixture of oligo lysines ($L_1$–$L_{10}$) in a bed 44.5 x 1.0 cm. 1.0 mg. test substances were dissolved in 1 ml. buffer, 0.02 M pyridine, 0.02 M acetic acid, pH 5.0, gradient (Autograde) to a final concentration of 0.15 M acetic acid, pH 5.0. The eluent was analyzed with ninhydrin. The result is shown on FIG. 3 where $L_1$, $L_2$, $L_3$, etc. on the curve refers to lysine, dilysine, trilysine, etc.

EXAMPLE 7

The same glycine cellulose bed is used. 2.0 mg. of a mixture of oligo lysine polymers ($L_{10}$–$L_{30}$) were dissolved in 1 ml. of buffer, 0.05 M pyridine, 0.033 M acetic acid, pH 5.28 gradient (Autograde) to a final concentration of 0.2 M pyridine, 0.133 M acetic acid, pH 5.30. The result is shown in FIG. 4.

From these examples of the use of amphoteric ion exchangers according to the present invention for separation of proteins in *Naja nictricollis* toxin, their valuable chromatographic properties are clearly evident:

1. Non-sensitivity for moderate pH shifts (a few tenths pH units) with great sensitivity for the ion concentration (which can be easily controlled). Therefore, very great separation ability can be obtained with linear buffer concentration gradients at constant pH.
2. Suitable conditions for linear chromatography for low molecular weight basic proteins can easily be found. Reproducibility is good.
3. High capacity at moderate ion strengths (e.g. with $NH_4OAc$, ion strength about 0.1) in the pH interval 4–9.
4. No irreversible adsorption ensues in the sense that the proteins cannot be eluted by moderate changes in the ion strength or pH of the buffer.
5. Rapid equilibration is obtained in buffer exchanges. This is very important in practical work and can open the door for technical applications. Concentration gradients migrate with little retardation through the bed.
6. Amphoteric, cross-linked gels are less inclined to change volume with milieu shifts that is the case for ordinary ion exchangers (this applies for $\beta$-alanine-Sephadex, especially in the pH interval 5–7).

In the examples, the buffer systems are chosen with respect to their volatility. However, there are numerous other buffer systems without this restriction which provide increased selectivity for the separation.

A number of protein in the *Naja nigricollis* toxin are low molecular weight and strongly positive-charged in these buffer systems used. Strongly acidic proteins show analogous behaviour in milieus where the amphoteric adsorbents function as weak anion exchangers. Fractionation of proteins with an iso-electric point in the pH interval 4–8 can also be expected to demand lower buffer ion concentrations than those used for the basic snake venom proteins. The chromatographic operation interval can also be advanced by introducing other types of amphoteric ion groups, inter alia, the guanidine and sulphonate groups in the gels.

Improved fractionation is obtained similarly in larger scale, beds which have a 3 cm. diameter and heights of from 1 to 1.5 meters. In this way, gram quantities of raw venom can be treated. The separation effect can be further increased in linear chromatography by a recycling procedure.

In summary, it can be established that amphoteric ion exchangers provide quite significant advantages as adsorbents for biological macromolecules. They can be expected to extensively complement or replace the now generally used, conventional ion exchangers. Extensive work is being done in order to more fully ascertain in detail how their ion-dipolar interaction influences the selectivity in separation of components having different charge properties. The strongest surface charges appear to result in an accentuated influence on adsorption compared with existing ion exchangers.

What we claim is:

1. A dipole-ion-exchange chromatographic method of separating different types of proteins and peptides from each other comprising passing a solution of polyelectrolytes selected from the group consisting of proteins and peptides, through a bed of an amphoteric adsorbent, said adsorbent comprising an insoluble, organic hydroxyl-containing, hydrophilic polymer containing both basic, nitrogen-containing groups and carboxylate groups in the same molecule, where the proportion between the basic and the acid groups is simple and stoichiometric, said polymer being the reaction product of an amino acid or an amino acid derivative and an insoluble organic hydroxyl-containing hydrophilic carbohydrate polymer, whereby said polyelectrolytes will migrate at different speeds depending on the strength of the reciprocal interaction between the polyelectrolyte and the substituents in said adsorbent, and are selectively adsorbed by said adsorbent.

2. A method according to claim 1, in which the carbohydrate is agar or agarose.

3. A method according to claim 1, in which the carbohydrate is cross-linked dextran.

4. A method according to claim 1, in which the carbohydrate is cellulose.

5. A method according to claim 1, and removing said adsorbed polyelectrolytes from said bed by elution.

References Cited

UNITED STATES PATENTS

| | | | |
|---|---|---|---|
| 3,645,852 | 2/1972 | Axen et al. | 260—112 R |
| 3,687,927 | 8/1972 | Huber | 260—113 |

HOWARD E. SCHAIN, Primary Examiner

U.S. Cl. X.R.

260—112 B, 112.5